United States Patent [19]

Clément et al.

[11] Patent Number: 5,723,587
[45] Date of Patent: Mar. 3, 1998

[54] AZO DYES

[75] Inventors: Antoine Clément, Basel; Athanassios Tzikas, Pratteln, both of Switzerland

[73] Assignee: Ciba Specialty Chemicals Corporation, Tarrytown, N.Y.

[21] Appl. No.: 694,142

[22] Filed: Aug. 8, 1996

Related U.S. Application Data

[63] Continuation of Ser. No. 398,038, Mar. 3, 1995, abandoned, which is a continuation of Ser. No. 237,476, May 3, 1994, abandoned.

[30] Foreign Application Priority Data

May 6, 1993 [CH] Switzerland ............... 1390/93
Jun. 4, 1993 [CH] Switzerland ............... 1673/93

[51] Int. Cl.$^6$ ............... C09B 29/085; C09B 29/09; D06P 1/18; D06P 3/54
[52] U.S. Cl. ............... 534/854; 534/851; 534/852; 534/788; 534/789; 534/795
[58] Field of Search ............... 534/851, 852, 534/854

[56] References Cited

U.S. PATENT DOCUMENTS

| | | | |
|---|---|---|---|
| 2,277,230 | 3/1942 | Heinrich | 534/852 |
| 2,373,700 | 6/1945 | McNally | 534/852 |
| 3,125,402 | 3/1964 | Kruckenberg et al. | 534/852 X |
| 4,030,881 | 6/1977 | Boyd | 8/675 |
| 4,035,143 | 7/1977 | Heinrich et al. | 534/854 |
| 4,229,345 | 10/1980 | Lamm | 534/852 X |
| 5,071,443 | 12/1991 | Bühler | 8/639 |
| 5,218,095 | 6/1993 | Trottmann | 534/789 |
| 5,292,872 | 3/1994 | Bühler | 534/854 |

FOREIGN PATENT DOCUMENTS

| | | |
|---|---|---|
| 0121875 | 10/1984 | European Pat. Off. |
| 0391121 | 10/1990 | European Pat. Off. |
| 0443984 | 8/1991 | European Pat. Off. |
| 2308044 | 8/1974 | Germany |
| 4001671 | 7/1991 | Germany ............... 534/852 |
| 1173218 | 12/1969 | United Kingdom ............... 534/854 |
| 1323303 | 7/1973 | United Kingdom |
| 1416112 | 12/1975 | United Kingdom |
| 2104909 | 3/1983 | United Kingdom ............... 534/852 |

OTHER PUBLICATIONS

Chem. Abstract, 102:47268h (1985) Bergmann, et. al.
Chem. Abstract, 114:12459c (1991).

*Primary Examiner*—Fiona T. Powers
*Attorney, Agent, or Firm*—David R. Crichton; Kevin T. Mansfield

[57] ABSTRACT

Disperse dyes of formula

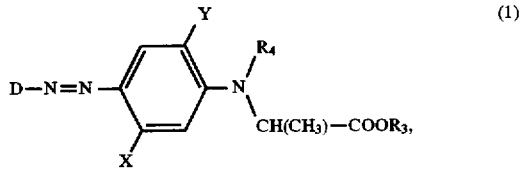

(1)

wherein

D is the radical of a diazo component of the benzene, naphthalene, diphenyl, azobenzene, thiophene, benzothiazole, benzisothiazole, thiazole, thiadiazole, indazole, benzotriazole, pyrazole, anthraquinone, naphtholimide, chromone or diphenylene oxid series;

X is hydrogen, methyl, halogen or —NH—CO—R, wherein R is methyl, ethyl, propyl, isopropyl, ethoxy or amino;

Y is hydrogen, halogen, methoxy or —O—$(CH_2)_n$—OR', wherein R' is hydrogen, $CH_3$ or $CH_2CH_2CN$, and n is an integer from 1 to 6;

$R_3$ is $C_1$–$C_6$alkyl, and $R_4$ is hydrogen, $C_1$–$C_6$alkyl or alkyl.

The dyes are particularly suitable for dyeing polyester textile material and are distinguished in particular by very good lightfastness.

8 Claims, No Drawings

AZO DYES

This is a continuation of application Ser. No. 08/398,038, filed Mar. 3, 1995, now abandoned, which is a continuation of application Ser. No. 08/237,476, filed May 3, 1994, now abandoned.

The present invention relates to disperse dyes, to their preparation and to the use thereof for dyeing textile materials.

Disperse dyes, i.e. dyes that are devoid of water-solubilising groups, have long been known in the art and are used for dyeing hydrophobic textile material. Often, however, the resultant dyeings are not sufficiently fast to thermomigration. This problem occurs in particular with red to blue shades.

To remedy this defect, special dyes have already been developed whose diffusion capacity is as low as possible owing to their molecular size and/or bulkiness. This characteristic, however, often makes dyeing with such dyes difficult, as they cannot be used, or they are of only very limited use, for dyeing by the exhaust process and, even in the thermosol process, they usually require undesirably high fixation temperatures.

Accordingly, the invention relates to disperse dyes that produce dyeings which are very fast to thermomogration, but nevertheless have good build-up in the exhaust and thermosol process as well as in textile printing. The dyes are also suitable for discharge printing.

The dyes of this invention have the formula

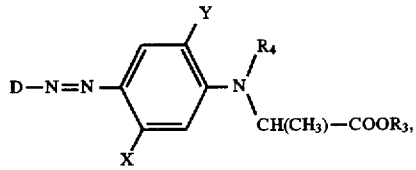
(1)

wherein

D is the radical of a diazo component of the benzene, naphthalene, diphenyl, azobenzene, thiophene, benzothiazole, benzisothiazole, thiazole, thiadiazole, indazole, benzodiazole, pyrazole, anthraquinone, naphtholimide, chromone or diphenylene oxid series;

X is hydrogen, methyl, halogen or —NH—CO—R, wherein R is methyl, ethyl, propyl, isopropyl, ethoxy or amino;

Y is hydrogen, halogen, methoxy or —O—(CH$_2$)$_n$—OR', wherein R' is hydrogen, CH$_3$ or CH$_2$CH$_2$CN, and n is an integer from 1 to 6;

R$_3$ is C$_1$–C$_6$ alkyl, and

R$_4$ is hydrogen, C$_1$–C$_6$ alkyl or allyl.

In particularly useful dyes of formula (1), X is preferably —NH—CO—R or Cl, wherein R is as defined above.

Y is preferably hydrogen, chloro or fluoro.

R$_3$ is preferably CH$_3$, C$_2$H$_5$, C$_3$H$_7$ and C$_4$H$_9$. The particularly preferred meaning is CH$_3$.

R$_4$ is preferably hydrogen or allyl. The particularly preferred meaning is hydrogen.

In especially useful dyes of formula (1), D is a radical of formula

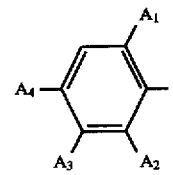
(2)

wherein A$_1$ is preferably hydrogen, chloro, cyano, nitro, methyl or COOCH$_3$; A$_2$ is hydrogen, halogen or cyano; A$_3$ is hydrogen, chloro, COOCH$_3$ or COOCH(CH$_3$)$_2$, and A$_4$ is hydrogen, methyl, chloro, nitro, COOCH$_3$, SO$_2$CH$_3$, OSO$_2$—C$_6$H$_5$ or SO$_2$C$_2$H$_5$. Among these dyes, those dyes merit particular interest in which A$_1$ is chloro or cyano, A$_2$ is hydrogen or chloro, A$_3$ is hydrogen or chloro and A$_4$ is nitro or SO$_2$CH$_3$.

The novel azo dyes of formula (1) can be prepared by methods which are known per se. They are conveniently prepared by diazotising a compound of formula

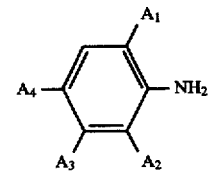
(3)

and coupling the diazonium salt of this compound to a coupling component of formula

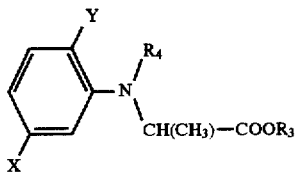
(4)

in which formulae (3) and (4) above A$_1$, A$_2$, A$_3$, A$_4$, X, Y, R$_3$ and R$_4$ are as defined for formulae (1) and (2).

The diazotisation of the compounds of formula (3) is carded out in per se known manner, typically with sodium nitrite in acid medium, conveniently in aqueous hydrochloric or sulfuric acid medium. Diazotisation can, however, also be carded out with other diazotising agents, conveniently with nitrosylsulfuric acid. The reaction medium of the diazotisation may contain an additional acid, typically phosphoric acid, sulfuric acid, acetic acid, propionic acid, hydrochloric acid or a mixture of these acids, for example a mixture of phosphoric acid and acetic acid. The diazotisation is carried out in the temperature range from −10° to 30° C., typically from −10° C. to room temperature.

The coupling of the diazotised compound of formula (3) to the coupling component of formula (4) is likewise carried out in known manner, conveniently in acid, aqueous or aqueous-organic medium, preferably in the temperature range from −10° C. to 30° C., more particularly in the temperature range from −10° C. to 10° C. The acids used are typically hydrochloric acid, acetic acid, sulfuric acid or phosphoric acid. Diazotisation and coupling may conveniently be carried out in a one-pot process, i.e. in the same reaction medium.

The diazo components of formula (3) are known compounds or can be prepared in a manner known per se.

The coupling components of formula (4) may likewise be prepared in per se known manner.

The novel compounds of formula (1) can be used as dyes for dyeing and printing semi-synthetic and, preferably, synthetic hydrophobic fibre materials, especially textile materials. Textile materials made from blends that contain such semi-synthetic or synthetic hydrophobic textile materials can also be dyed or printed with the novel compounds.

Semi-synthetic textile materials are in particular cellulose secondary acetate and cellulose triacetate.

Synthetic hydrophobic textile materials consist primarily of linear aromatic polyesters, typically those from terephthalic acid and glycols, especially ethylene glycol, or condensates of terephthalic acid and 1,4-bis(hydroxymethyl) cyclohexane; from polycarbonates, e.g. those from α,α-dimethyl-4,4'-dihydroxydiphenylmethane and phosgene, or from polyvinyl chloride and polyamide fibres.

The novel compounds are applied to the textile materials by known dyeing methods. Polyester materials are conveniently dyed from an aqueous dispersion by the exhaust process in the presence of customary anionic or nonionic detergents and usually of customary swelling agents (carriers) in the temperature range from 80° to 140° C. Cellulose secondary acetate is preferably dyed in the temperature range from about 65° to 85° C., and cellulose triacetate in the temperature range up to 115° C.

The novel dyes do not stain wool and cotton simultaneously present in the dyebath or effect only minor staining (very good resist), so that they may also readily be used for dyeing polyester/wool and polyester/cellulose blended fabrics.

The novel dyes are suitable for dyeing by the thermosol process, for exhaust dyeing and for printing.

The textile material may be in any form of presentation, including fibres, yarn or nonwoven fabric, or woven or knitted fabric.

It is expedient to convert the novel dyes before use into a dye formulation. This is done by milling the dye to an average particle size of 0.1 to 10 micron. Milling can be carried out in the presence of a dispersant. Typically the dye is milled with a dispersant, or kneaded in paste form with a dispersant and thereafter vacuum dried or spray dried. Printing pastes and dyebaths can be prepared by adding water to the resultant formulations.

The customary thickeners will be used for printing. Illustrative examples of such thickeners are modified or unmodified natural products, typically alginates, British gum, gum arabic, crystal gum, carob bean gum, tragacanth, carboxymethyl cellulose, hydroxyethyl cellulose, starch or synthetic products, including polyacrylamides, polyacrylic acid or copolymers thereof or polyvinyl alcohols.

The cited materials, especially polyester material, are dyed with the novel dyes in level shades of very good end-use properties, in particular fastness to heat-setting, pleating, chlorine and wetfastness properties such as fastness to water, perspiration and washing. The dyeings are also distinguished by very good rubfastness. To be singled out for special mention are the good fastness to thermomigration and the very good lighffastness of the dyeings.

The novel dyes can also be readily used for obtaining mixed shades in conjunction with other dyes. It is, of course, also possible to use mixtures of the novel dyes with one another.

Furthermore, the novel dyes are very suitable for dyeing hydrophobic textile material from supercritical $CO_2$.

Further objects of the invention are the aformentioned use of the azo dyes of formula (1) and a process for dyeing or printing semi-synthetic material or synthetic hydrophobic material, preferably textile material, which comprises applying to, or incorporating in, said material one or more than one compound of formula (1). The hydrophobic fibre material is preferably polyester textile material. Further substrates which can be treated by the process of the invention and preferred process conditions have been discussed above in the more detailed description of the use of the novel compounds.

The hydrophobic fibre material, preferably polyester textile material, dyed or printed by the instant process, also constitutes an object of the invention.

The novel dyes of formula (1) are also suitable for state of the an marking methods, for example heat transfer printing.

The invention is illustrated in more detail by the following non-limitative Examples in which, unless otherwise indicated, pans and percentages are by weight.

EXAMPLE 1

A mixture of 10.7 g of m-toluidine, 45 ml of methyl 2-chloropropionate, 10 g of sodium carbonate and 0.5 g of sodium bromide is stirred for 18 hours at 125°–130° C. Afterwards the reaction mixture is cooled to room temperature and extracted with a mixture of ethyl acetate/water. The ethyl acetate phase is then concentrated on a rotary evaporator, giving 17 g of a yellowish-brown oil of formula

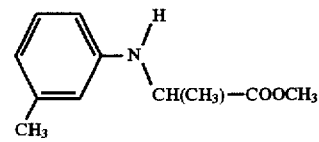

3.3 g of 2-cyano-4-nitroaniline are diazotised in conventional manner in concentrated sulfuric acid and the diazonium salt so obtained is coupled at pH 3–5 to an equivalent amount of the above coupling component. The crude product is isolated by filtration and mixed with 100 ml of methanol, and the mixture is stirred for 2 hours at reflux temperature and filtered hot. The filter product is dried, giving 6 g of crystals with a melting point of 175°–177° C. The dye has the formula

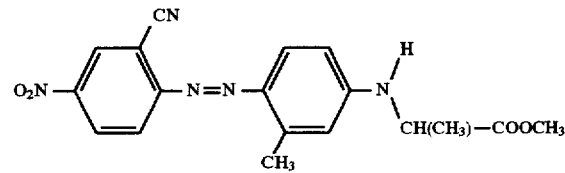

and dyes polyester textile material in red shades. The dyeings have good fastness properties, in particular good fastness to thermomigration and light.

EXAMPLE 2

A mixture of 16.4 g of 3-propionamidoaniline, 11.7 g of powdered sodium carbonate, 1.6 g of sodium bromide and 50 ml of methyl 2-chloropropionate is stirred for 5 hours at 120°–130° C. The reaction mixture is then cooled to 120° C., filtered hot and the filter product is washed with 20 ml of methyl 2-chloropropionate. The filtrate is concentrated on a rotary evaporator, giving 25 g of a powder of formula

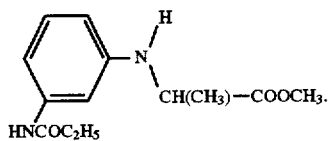

17.3 g of 2-chloro-4-nitroaniline are diazotised in conventional manner in concentrated sulfuric acid and the diazonium salt so obtained is coupled at pH3–5 to an equivalent amount of the above described coupling component. The crude product is isolated by filtration and mixed with 100 g of water, and the mixture is stirred for 1 hour at 95°–97° C., then cooled to 70° C. and filtered. The filter product is dried to give a red powder with a melting point of 165°–167° C. The dye has the formula

and dyes polyester textile material in brilliant red shades.

EXAMPLES 3 to 101

The following dyes can be obtained by the procedure described in Examples 1 and 2. They dye polyester textile material in the shades indicated in the last column of Tables 1 to 8.

TABLE 1

R*—N=N—[benzene ring with NH—COCH₃ and N(H)CH(CH₃)—COOCH₃]

| Ex. | R* | Shade |
|---|---|---|
| 3 | 4-CH₃, 3-COOCH(CH₃)₂ phenyl | yellow |
| 4 | 4-H₃COOC phenyl | golden yellow |
| 5 | 3-COOCH₃ phenyl | yellow |
| 6 | 4-O₂N phenyl | orange |
| 7 | 2-Cl, 4-O₂N phenyl | yellowish red |
| 8 | 2-CN, 4-O₂N phenyl | red |
| 9 | nitro-benzisothiazolyl | blue |
| 10 | N-ethyl phthalimidyl | orange |
| 11 | 2-NO₂, 4-H₅C₂O₂S phenyl | scarlet |

TABLE 2

R*—N=N—[benzene ring with NH—COC₂H₅ and N(H)CH(CH₃)—COOCH₃]

| Ex. | R* | Shade |
|---|---|---|
| 12 | 4-H₃COOC phenyl | golden yellow |
| 13 | 3-COOCH₃ phenyl | yellow |

TABLE 2-continued

R*—N=N—[2,5-disubstituted phenyl with NH—COC₂H₅ and N(H)—CH(CH₃)—COOCH₃]

| Ex. | R* | Shade |
|---|---|---|
| 14 | 4-COOCH₃, 2-CH₃-phenyl | yellow |
| 15 | 4-NO₂-phenyl | orange |
| 16 | 2-CN, 4-NO₂-phenyl | red |
| 17 | 4-nitro-benzisothiazolyl (N=C(CH₃)-S-) | blue |
| 18 | N-ethyl-phthalimide (5-yl) | orange |
| 19 | 2-NO₂, 4-SO₂C₂H₅-phenyl | scarlet |

TABLE 3

R*—N=N—[4-substituted phenyl with N(H)—CH(CH₃)—COOCH₃]

| Ex. | R* | Shade |
|---|---|---|
| 20 | 4-NO₂-phenyl | orange |
| 21 | 2-CN, 4-NO₂-phenyl | scarlet |

TABLE 3-continued

R*—N=N—[4-substituted phenyl with N(H)—CH(CH₃)—COOCH₃]

| Ex. | R* | Shade |
|---|---|---|
| 22 | 2-NO₂, 4-NO₂, 5-Br-phenyl | scarlet |
| 23 | 2-Cl, 4-NO₂-phenyl | orange |
| 24 | N-ethyl-5-bromo-phthalimidyl | orange |
| 25 | N-methyl-5-bromo-phthalimidyl | orange |
| 26 | N-propyl-5-bromo-phthalimidyl | orange |

TABLE 4

R*—N=N—[2-Cl, 5-NHCOCH₃ phenyl with N(H)—CH(CH₃)—COOCH₃]

| Ex. | R* | Shade |
|---|---|---|
| 27 | 2-Cl, 4-NO₂-phenyl | scarlet |
| 28 | 2-CN, 4-NO₂-phenyl | red |

TABLE 4-continued

Structure: R*—N=N—[benzene ring with Cl, NH—COCH₃, and NH(H)—CH(CH₃)—COOCH₃ substituents]

| Ex. | R* | Shade |
|---|---|---|
| 29 | benzisothiazole with NO₂ | blue |
| 30 | 4-(H₃COOC)-phenyl | yellow |
| 31 | 2-(COOCH₃)-phenyl | yellow |
| 32 | 3-(COOCH₃)-phenyl | yellow |
| 33 | 4-Cl, 3-COOCH₃ phenyl | yellow |
| 34 | 4-Cl, 3-COOC₂H₅ phenyl | yellow |
| 35 | 2,5-bis(COOC₂H₅) phenyl | yellow |
| 36 | 4-O₂N-phenyl | yellow orange |
| 37 | 2-NO₂, 4-Cl phenyl | yellow orange |
| 38 | 2,5-Cl₂, 4-NO₂ phenyl | orange |
| 39 | 2,4-Cl₂ phenyl | golden yellow |
| 40 | 2,5-Cl₂ phenyl | yellow |
| 41 | 2,4,5-Cl₃ phenyl | yellow |
| 42 | 4-(H₃CO₂S), 2-NO₂ phenyl | golden yellow |
| 43 | 4-(H₃CO₂S), 3-Cl phenyl | golden yellow |
| 44 | N-ethyl bromophthalimide (H₅C₂—N) | scarlet |
| 45 | N-methyl bromophthalimide (H₃C—N) | scarlet |

TABLE 4-continued
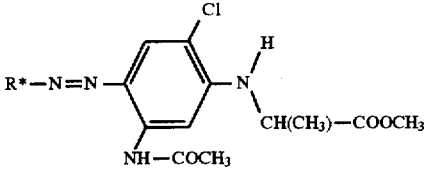
| Ex. | R* | Shade |
|---|---|---|
| 46 |  | scarlet |
TABLE 5
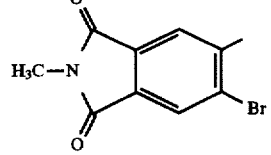
| Ex. | $R_1$ | $R_2$ | R* | Shade |
|---|---|---|---|---|
| 47 | Cl | H | 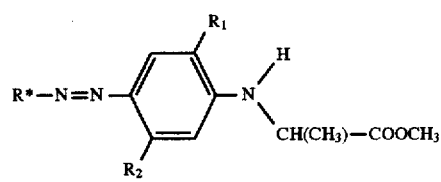 | golden yellow |
| 48 | $OC_2H_4OH$ | $CH_3$ | 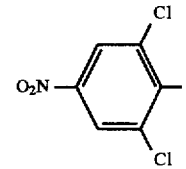 | red |
| 49 | $OC_2H_4OH$ | $CH_3$ | 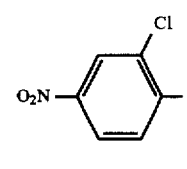 | bordeaux |
| 50 | $OCH_3$ | $NHCOCH_3$ | 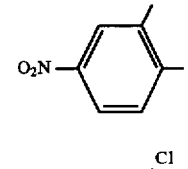 | red |
| 51 | $OC_2H_4OCH_3$ | $CH_3$ | 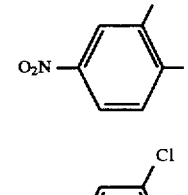 | red |

TABLE 5-continued

R*—N=N—[benzene ring with R₁ (top), R₂ (bottom), and N(H)—CH(CH₃)—COOCH₃ substituent]

| Ex. | R₁ | R₂ | R* | Shade |
|---|---|---|---|---|
| 52 | OC₂H₄OC₂H₄CN | CH₃ | 2-Cl-4-NO₂-phenyl | red |
| 53 | Cl | Cl | 2-Cl-4-NO₂-phenyl | orange |
| 54 | Cl | Cl | 2-CN-4-NO₂-phenyl | red |
| 55 | Cl | Cl | 2,5-Cl₂-4-NO₂-phenyl | yellow |
| 56 | Cl | H | N-ethyl-bromo-phthalimidyl | golden yellow |
| 57 | H | CH₃ | N-ethyl-bromo-phthalimidyl | orange |

TABLE 6

R*—N=N—[benzene ring with R₁ (top), R₂ (bottom), and N(CH₂—CH=CH₂)(CH(CH₃)—COOCH₃) substituent]

| Ex. | R₁ | R₂ | R* | Shade |
|---|---|---|---|---|
| 58 | H | H | 2,4-dinitrophenyl | bordeaux |

TABLE 6-continued

[Structure: R*-N=N- benzene ring with R₁ (top), R₂ (bottom), and N(CH₂-CH=CH₂)(CH(CH₃)-COOCH₃) substituent]

| Ex. | R₁ | R₂ | R* | Shade |
|---|---|---|---|---|
| 59 | H | CH₃ | 2-NO₂, 4-O₂N phenyl (methyl) | red |
| 60 | H | CH₃ | 2-CN, 4-O₂N phenyl (methyl) | red |
| 61 | Cl | NHCOCH₃ | 2-CN, 4-O₂N phenyl (methyl) | red |
| 62 | H | CH₃ | 2-Cl, 4-O₂N phenyl (methyl) | scarlet |
| 63 | H | NHCOCH₃ | 2-Cl, 4-O₂N phenyl (methyl) | red |
| 64 | Cl | NHCOCH₃ | 2-Cl, 4-O₂N phenyl (methyl) | scarlet |
| 65 | H | NHCOCH₃ | 2-NO₂, 5-O₂N, 4-CN phenyl | blue |
| 66 | H | NHCOCH₃ | 2-CN, 5-O₂N, 4-CN phenyl | blue |
| 67 | OCH₃ | NHCOCH₃ | 2-NO₂, 5-O₂N, 4-Br phenyl | blue |

TABLE 6-continued
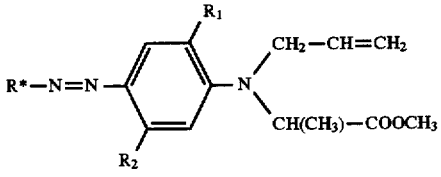
| Ex. | $R_1$ | $R_2$ | R* | Shade |
|---|---|---|---|---|
| 68 | OCH$_2$CH$_2$OCH$_3$ | NHCOCH$_3$ | 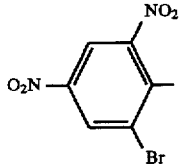 | blue |
| 69 | OCH$_2$CH$_2$OCH$_3$ | NHCOC$_2$H$_5$ | 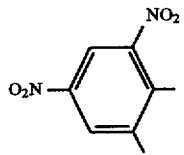 | blue |
| 70 | H | NHCOCH$_2$H$_5$ | 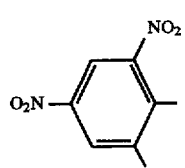 | blue |
| 71 | OCH$_3$ | NHCOCH$_3$ | 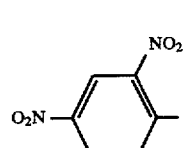 | blue |
| 72 | OCH$_3$ | NHCOCH$_3$ | 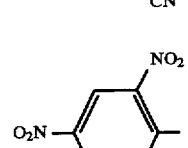 | blue |
| 73 | H | NHCOC$_2$H$_5$ | 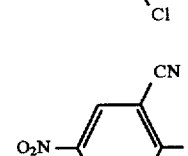 | blue |
| 74 | H | NHCOCH$_3$ | 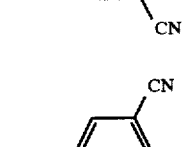 | red |

TABLE 6-continued

Structure: R*—N=N—[benzene with R₁ (top), R₂ (bottom), and N(CH₂—CH=CH₂)(CH(CH₃)—COOCH₃)]

| Ex. | R₁ | R₂ | R* | Shade |
|---|---|---|---|---|
| 75 | H | NHCOC₂H₅ | 2,4-dicyano-5-methylphenyl (CN, CH₃, CN) | red |
| 76 | H | H | 3-chloro-4-(methylsulfonyl)phenyl (H₃CO₂S, Cl) | yellow |
| 77 | H | CH₃ | 3-chloro-4-(methylsulfonyl)phenyl (H₃CO₂S, Cl) | yellow |
| 78 | H | H | 4-(phenylsulfonyloxy)phenyl (C₆H₅-SO₂-O-) | yellow |
| 79 | H | NHCOCH₃ | 5-bromo-2-(N-ethylphthalimido) group (H₅C₂—N, Br) | red |
| 80 | H | NHCOC₂H₅ | nitro-benzisothiazolyl (NO₂, N, S) | blue |
| 81 | H | NHCOCH₃ | nitro-benzisothiazolyl (NO₂, N, S) isomer | blue |
| 82 | H | NHCOCH₃ | nitro-thiazolyl (NO₂, N, S) | blue |
| 83 | H | CH₃ | ethoxycarbonyl-methyl-thiazolyl (CH₃, COOC₂H₅, N, S) | red |

TABLE 7

[Structure: R*—N=N—[benzene ring with R1, R2]—N(CH2—CH=CH2)(CH(CH3)—COOC2H5)]

| Ex. | R1 | R2 | R* | Shade |
|---|---|---|---|---|
| 84 | H | H | 2,4-dinitrophenyl | bordeaux |
| 85 | H | CH3 | 2,4-dinitrophenyl | red |
| 86 | H | CH3 | 2-cyano-4-nitrophenyl | red |
| 87 | Cl | NHCOCH3 | 2-cyano-4-nitrophenyl | red |
| 88 | H | CH3 | 2-chloro-4-nitrophenyl | scarlet |
| 89 | H | NHCOCH3 | 2-chloro-4-nitrophenyl | red |
| 90 | Cl | NHCOCH3 | 2-chloro-4-nitrophenyl | scarlet |
| 91 | H | NHCOCH3 | 2-cyano-4,6-dinitrophenyl | blue |
| 92 | H | NHCOCH3 | 2,6-dicyano-4-nitrophenyl | blue |

TABLE 7-continued
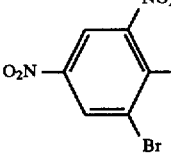
| Ex. | $R_1$ | $R_2$ | R* | Shade |
|---|---|---|---|---|
| 93 | OCH$_3$ | NHCOCH$_3$ | 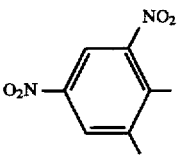 | blue |
| 94 | OCH$_2$CH$_2$OCH$_3$ | NHCOCH$_3$ | 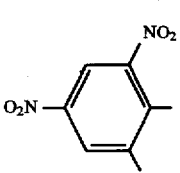 | blue |
| 95 | OCH$_2$CH$_2$OCH$_3$ | NHCOC$_2$H$_5$ | 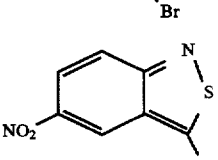 | blue |
| 96 | H | NHCOCH$_3$ | 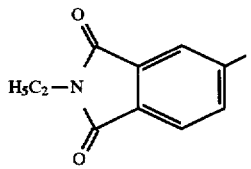 | blue |
TABLE 8
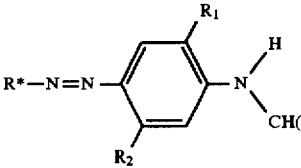
| Ex. | $R_1$ | $R_2$ | R* | Shade |
|---|---|---|---|---|
| 97 | Cl | NHCOCH$_3$ | 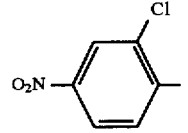 | orange |
| 98 | H | NHCOCH$_3$ | 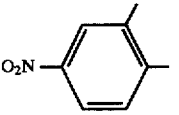 | red |
| 99 | Cl | NHCOCH$_3$ | 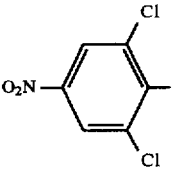 | scarlet |
| 100 | Cl | NHCOCH$_3$ | | orange |

TABLE 8-continued

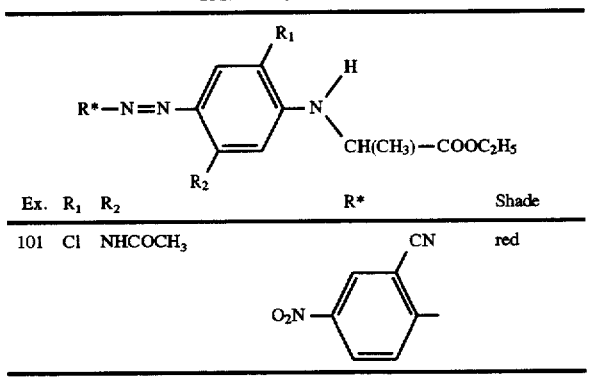

| Ex. | $R_1$ | $R_2$ | R* | Shade |
|---|---|---|---|---|
| 101 | Cl | NHCOCH$_3$ | (2-CN-4-O$_2$N-phenyl) | red |

What is claimed is:

1. A dye of formula

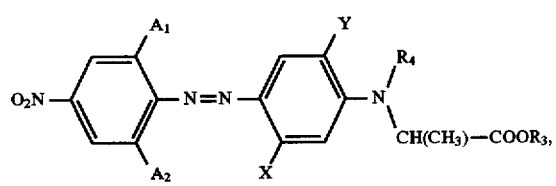

wherein a) $A_1$ is cyano, $A_2$ is hydrogen, X is —NH—CO—CH$_3$, Y is chloro, $R_3$ is methyl and $R_4$ is hydrogen, or b) $A_1$ is chloro, $A_2$ is chloro, X is —NH—CO—CH$_3$, Y is chloro, $R_3$ is methyl and $R_4$ is hydrogen, or c) $A_1$ is chloro, $A_2$ is chloro, X is hydrogen, Y is chloro, $R_3$ is methyl and $R_4$ is hydrogen, or d) $A_1$ is nitro, $A_2$ is bromo, X is —NH—CO—CH$_3$, Y is methoxy, $R_3$ is ethyl and $R_4$ is —CH$_2$—CH=CH$_2$, or e) $A_1$ is chloro, $A_2$ is chloro, X is —NH—CO—CH$_3$, Y is chloro, $R_3$ is ethyl and $R_4$ is hydrogen, or f) $A_1$ is nitro, $A_2$ is bromo, X is —NH—CO—CH$_3$, Y is methoxy, $R_3$ is methyl and $R_4$ is —CH$_2$—CH=CH$_2$, or g) $A_1$ is nitro, $A_2$ is chloro, X is —NH—CO—CH$_3$, Y is methoxy, $R_3$ is methyl and $R_4$ is —CH$_2$—CH=CH$_2$.

2. The dye according to claim 1 of the formula

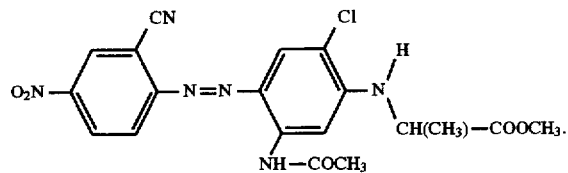

3. The dye according to claim 1 of the formula

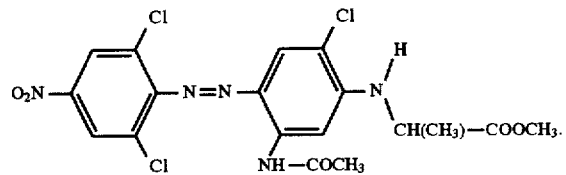

4. The dye according to claim 1 of the formula

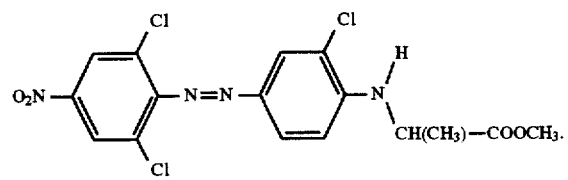

5. The dye according to claim 1 of the formula

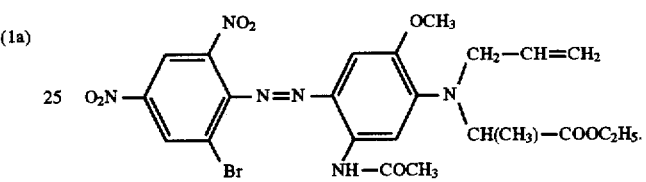

6. The dye according to claim 1 of the formula

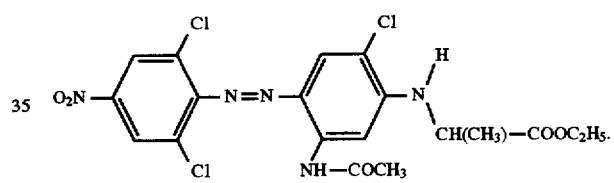

7. The dye according to claim 1 of the formula

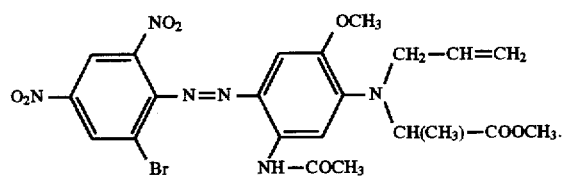

8. The dye according to claim 1 of the formula

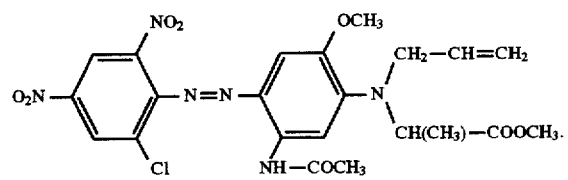

* * * * *